Oct. 17, 1950 H. L. DONLEY ET AL 2,526,207

CAPACITOR FOR FREQUENCY MODULATION

Filed April 27, 1946

INVENTORS
HUGH L. DONLEY
& CHANDLER WENTWORTH
BY H. G. Grover
ATTORNEY

Patented Oct. 17, 1950 2,526,207

UNITED STATES PATENT OFFICE 2,526,207

CAPACITOR FOR FREQUENCY MODULATION

Hugh L. Donley and Chandler Wentworth, Princeton, N. J., assignors to Radio Corporation of America, a corporation of Delaware Application April 27, 1946, Serial No. 665,383

1 Claim. (Cl. 175—41)

This invention relates to a new and useful means for and a method of capacity variation and frequency modulation.

An object of this invention is to provide a variable capacitor having fixed plates separated by a dielectric whose dielectric constant changes with field strength.

Another object of this invention is to provide an improved method of producing frequency modulation by means of the change in dielectric constant, with applied voltage, of high-dielectric-constant materials of the titanate type.

Still another object of this invention is to provide a miniature capacitor, the physical dimensions thereof being of such minute proportions as to require support members which are substantially larger than the dielectric material.

A feature of this invention is the novel circuit arrangement of placing a small capacitor, whose dielectric constant is proportional to the applied voltage, in a modulating circuit.

Although frequency modulation circuits are old in the art, as known they are invariably complicated in make up and operation. For example, one type thereof requires the use of one or more reactance tubes, each tube having an anode, a cathode and a plurality of grid socket connections. Likewise, the reactance tubes require other associated equipment such as by-pass condensers and various bias resistors. This equipment is in addition to the necessary oscillatory circuits wherein the carrier current to be modulated appears.

This invention is particularly adapted to improve the circuits known in the prior art, in that it reduces the weight, simplifies the wiring, eliminates the various socket connections, and reduces the cost of equipment. These features are particularly adaptable to portable light weight radio apparatus, such as walkie-talkies, police receivers, and the like. The above advantages are accomplished by eliminating the modulating tubes (in the example given the reactance tube used in a frequency modulation circuit) and substituting therefor a small variable capacitor the physical area of which is approximately equal to the head of an ordinary common pin. This small area and a correspondingly small thickness of dielectric material provides a condenser of relatively large capacity, whose capacity is variable in response to low voltage changes. This type of capacitor or condenser is not to be confused with the ordinary variable condenser wherein the elements consist of a fixed electrode and a variable electrode, the latter of which is generally moved to change the area in capacity coupling to the fixed electrode. The condenser dielectrics of this invention are unlike the ordinary dielectrics of medium or low dielectric constant ($k$). The dielectrics of this invention are composed of ceramic powders composed in part of titanates possessing large values of $k$, and which will exhibit a large change of $k$ with changes in field strength (E). This results in large capacity variations. Moreover the changes take place on application of low voltages. This capacity change may be made very pronounced for low applied voltages by using a ceramic condenser having a titanate dielectric of only a few mils in thickness so that large changes in $k$ are possible with only a small change in the applied voltage.

This invention is illustrated by the accompanying drawing, in which.

Figure 1:
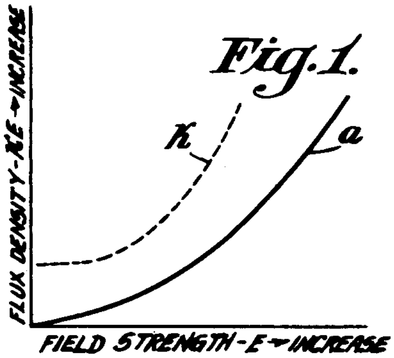
Fig. 1 is a curve which shows how the capacity of condensers in this invention varies with variation in voltage.

Referring now to Fig. 1 of the drawing, the dielectric flux density $kE$ is shown plotted against field strength E indicated by the characteristic curve $a$ in which $k$ depends upon flux density being a maximum for moderate values of $kE$. The incremental or the alternating current dielectric constant decreases with an increase in the direct current field strength and the alternating current dielectric constant increases with an increase in the alternating current flux density. Consequently, the above characteristics which are found to be inherent in the ceramic dielectrics, particularly those of the titanate class, may be used to frequency modulate an oscillator having the titanate condensers of this invention as part of the tuning capacitor of the oscillator. With such a circuit arrangement, it will be found that the tuning capacity, and therefore the oscillator frequency, will vary in accordance with a low or modulating frequency. A symmetrical oscillator "swing" or deviation is obtained by means of direct current bias applied to the titanate condenser.

Figure 2:
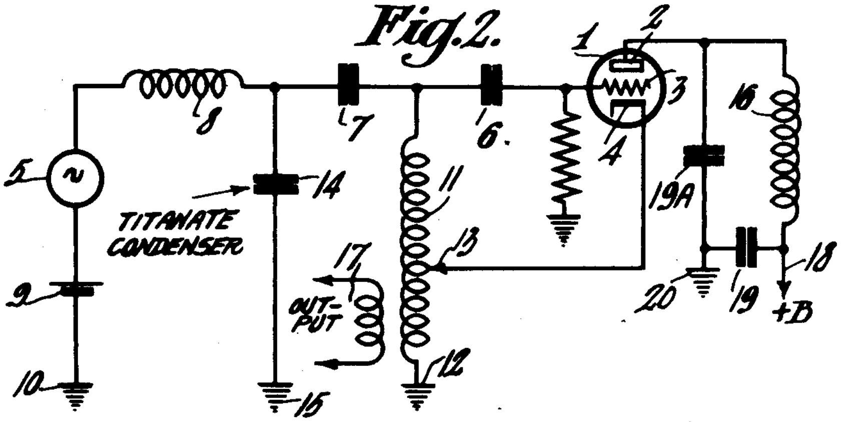
Fig. 2 is a circuit arrangement showing the use of a titanate condenser in a frequency modulation circuit.

Referring now to the circuit arrangement shown in Fig. 2, an oscillator circuit is shown which includes an oscillating tube 1 having at least an anode 2, grid 3 and cathode 4. The oscillator circuit is coupled to a source of modulating frequency 5 by means of fixed mica capacitors 6 and 7. Although only one modification of an oscillator circuit is shown, it is to be understood that any type of an oscillator circuit may be employed with equally satisfactory results, such as the well known Hartley or Colpitts' circuits, or the like. A radio frequency choke 8 is provided to absorb the undesired radio frequency currents. If desired, a suitable bias voltage 9 may be connected from the source of modulating frequency current and connected to ground at 10. The oscillator inductance includes a tuning coil 11 connected to ground 12 and having a tap 13 which may be variable to control the frequency of oscillation. The tap 13 is connected to cathode circuit 4 of tube 1. The tuning of the oscillator circuit is accomplished by the titanate flake condenser 14 of this invention. The process of making the minute flake condenser will be explained later in connection with Figs. 3, 4, 5 and 6.

The flake condenser is connected between condenser 7 and the radio frequency choke 8. One electrode of the condenser is connected to ground at 15. Condenser 14 of this invention is of the type whose $k$ is a function of the applied voltage. The output of the frequency modulation circuit of this invention is taken from a coupling element 17. A radio frequency inductance choke 16 is connected to the positive B-voltage supply at 18. Suitable by-pass condensers 19 and 19A are connected to ground at 20 for by-passing the undesired radio frequency currents. With such a circuit, using the condenser of this invention, it is found that no audible distortion was discerned over the audio band due to dielectric hysteresis or viscosity. One advantage in the above mentioned circuit arrangement is the omission of the customary reactance tube. Furthermore, in accordance with the usual modulation frequency practice, the oscillator center frequency can be controlled by varying the bias in the saturable dielectric by means of the direct current voltage obtained from a discriminator (not shown) which is operated from the oscillator output 17.

Figures 3, 4:
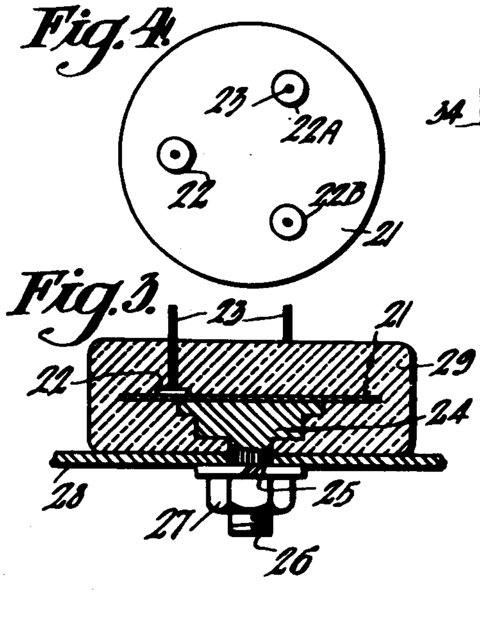
Fig. 3 is a sectional view of one form of a condenser of this invention.
Fig. 4 is a plan view of Fig. 3.

Referring now to Figs. 3 and 4 of the drawing, a metallic disc 21, which is preferably of silver, has located thereon a flake dielectric 22. The flake preferably has a thickness of from 5 mils to 7 mils and a diameter of approximately 35 mils. These small dimensions will provide a condenser whose capacity is approximately 250 micromicrofarads. It is to be understood that the dielectric dimensions and capacity value are merely given as examples, since their size will depend upon the circuit in which the device is to be employed and the frequency at which it is to be operated. Additional dielectrics 22A and 22B may be placed on plate 21. If desired, the flake dielectrics 22A and 22B may each have a different thickness and capacitive area are different frequency ranges. The dielectric flake or plate 22 is preferably circular although it may be square, rectangular or have any other suitable geometric shape. The dielectric plate 22 is prepared by compressing various titanate powders, consisting, for example, of extremely fine particles, of 71% barium titanate and 29% of strontium titanate to which is added a suitable binder. The flake 22 is formed by pressing the powder in a suitable die and firing at 1300° C. to 1400° C. The flake is permitted to cool within the oven of the electric furnace, and after cooling both of its two major surfaces are coated with a silver paste. The dielectric flake is again placed in the electric furnace and heated to approximately 700° C. to change the paste to metallic silver. One surface of the dielectric flake is then soldered to the surface of disc 21. The other surface of the dielectric flake is soldered to a small wire or cat-whisker 23. The disc 21 which serves as a common electrode is then soldered to a mechanical support stud 24, which stud may be of any form, such for example as the type having a knurled portion 25 and a threaded portion 26. The threaded portion 26 is provided with a threaded nut 27 through which the device may be soldered to a metallic support member 28. To prevent entry of moisture which might deteriorate the dielectric flake, a suitable plastic embedment 29 surrounds the upper portion of stud 24, disc 21 and flake 22. The plastic embedment also securely anchors the cat-whisker 23 in position.

Figure 6:
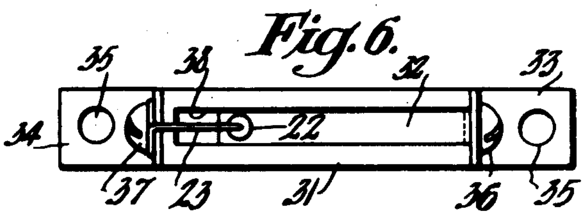
Fig. 6 is a plan view of Fig. 5.
Figure 5:
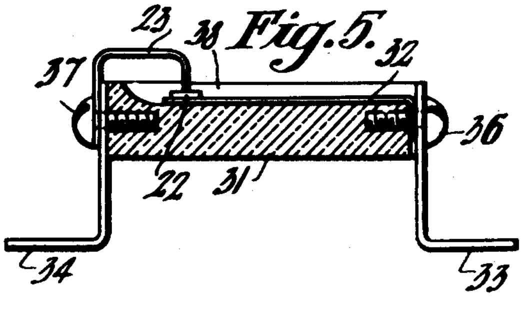
Fig. 5 is a sectional view of another modification of the condenser of this invention.

The modifications shown in Figs. 5 and 6 include a circular insulating rod 31 which has located thereon a longitudinal slot 38. The rod 31 is supported by two metallic angle brackets 33 and 34, each one of which is provided with suitable mounting apertures 35. The upper end of each of angle brackets 33 and 34 is provided with a suitable aperture 36 through which mounting screws 37 pass. Located within the longitudinal slot 38 is a metallic silver strip 32 upon which is mounted a dielectric flake 22 which is of similar dimensions and is made by the same process as that mentioned above in connection with Figs. 3 and 4. The strip 32 is fastened and soldered to the upper end of mounting bracket 33. The free end of the cat-whisker 23 is soldered to the upper end of angle bracket 34. Electrical connection can then be made to angle brackets 33 and 34. To prevent entry of moisture, the entire device is dipped into a suitable insulating medium by any suitable process.

What is claimed is:

A capacitor the capacitance of which is varied in response to variations in applied potential, comprising a ceramic flake of titanate dielectric having a thickness of from 5 mils to 7 mils and a diameter of approximately 35 mils to give a capacitance of approximately 250 micromicrofarads, a metallic coating on each major surface of said flake of dielectric to provide the electrodes of said capacitor, and supporting means for said dielectric secured to at least one electrode of said capacitor, said supporting means being of substantially greater area than the area of said flake of dielectric.

HUGH L. DONLEY.
CHANDLER WENTWORTH.

REFERENCES CITED

The following references are of record in the file of this patent:

UNITED STATES PATENTS

| Number | Name | Date |
|---|---|---|
| 2,012,710 | Crosby | Aug. 27, 1935 |
| 2,161,888 | Rearick | June 13, 1939 |
| 2,182,377 | Guanella | Dec. 5, 1939 |
| 2,233,165 | Goldman | Feb. 25, 1941 |
| 2,306,555 | Mueller | Dec. 29, 1942 |
| 2,377,910 | Wainer | June 12, 1945 |
| 2,398,176 | Deyrup | Apr. 9, 1946 |
| 2,461,307 | Antalek | Feb. 8, 1949 |
| 2,473,556 | Wiley | June 21, 1949 |

FOREIGN PATENTS

| Number | Country | Date |
|---|---|---|
| 518,127 | Great Britain | Feb. 19, 1940 |

OTHER REFERENCES

"Radio Engineer's Handbook," first ed., 1943, by F. E. Terman, Published by McGraw Hill Book Company.

Electronic Industries, April 1946, pages 90, 91, 122, received in U. S. Patent Office April 8, 1946.

Ser. No. 404,984, Schneider (A. P. C.), published May 18, 1943.